June 7, 1932.  A. B. HODGES  1,861,796
LIQUID TREATMENT
Filed Sept. 6, 1928  3 Sheets-Sheet 1
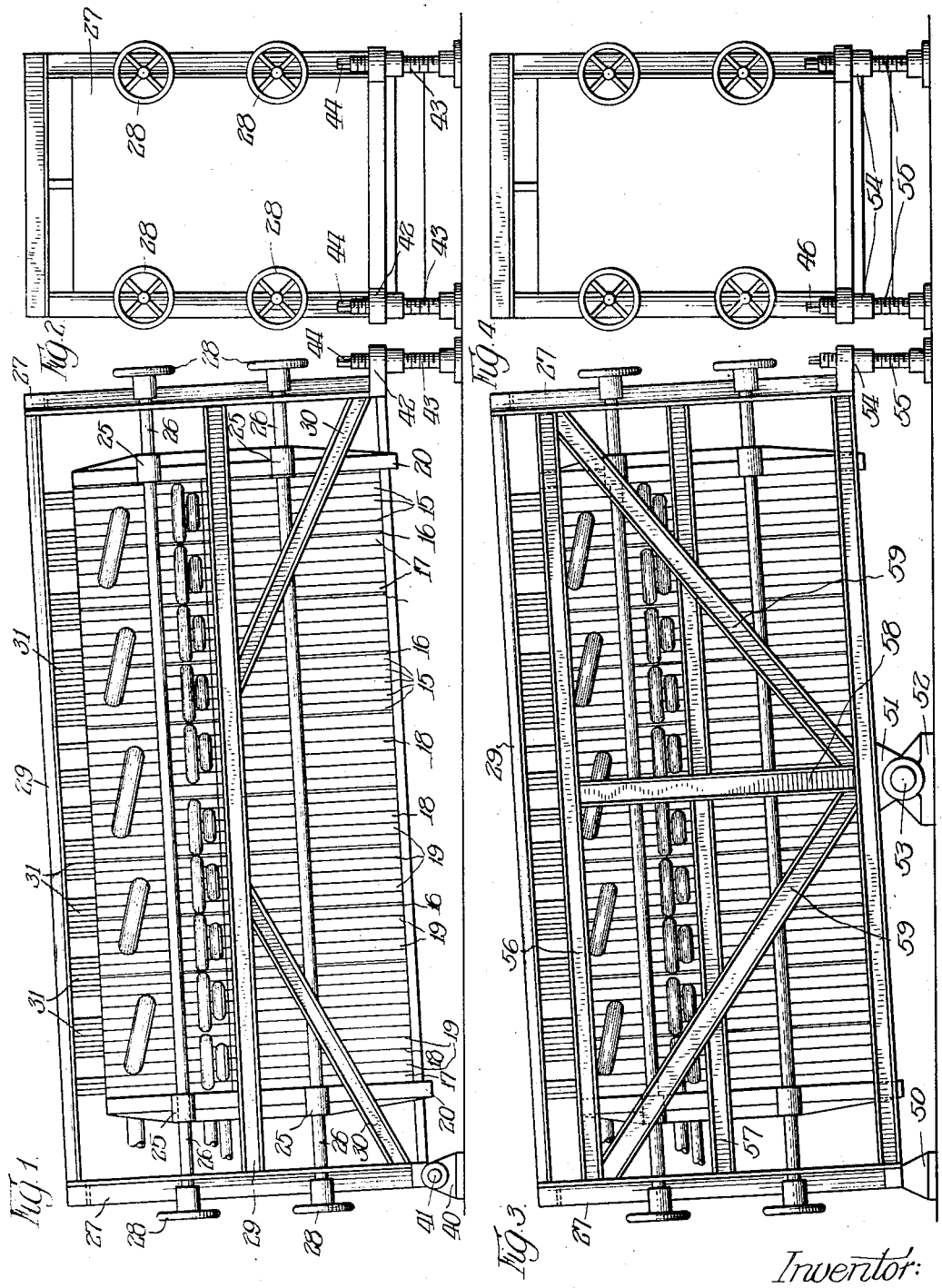
Inventor:
Albert B. Hodges,
By Cromwell, Greist & Warden
Attys.

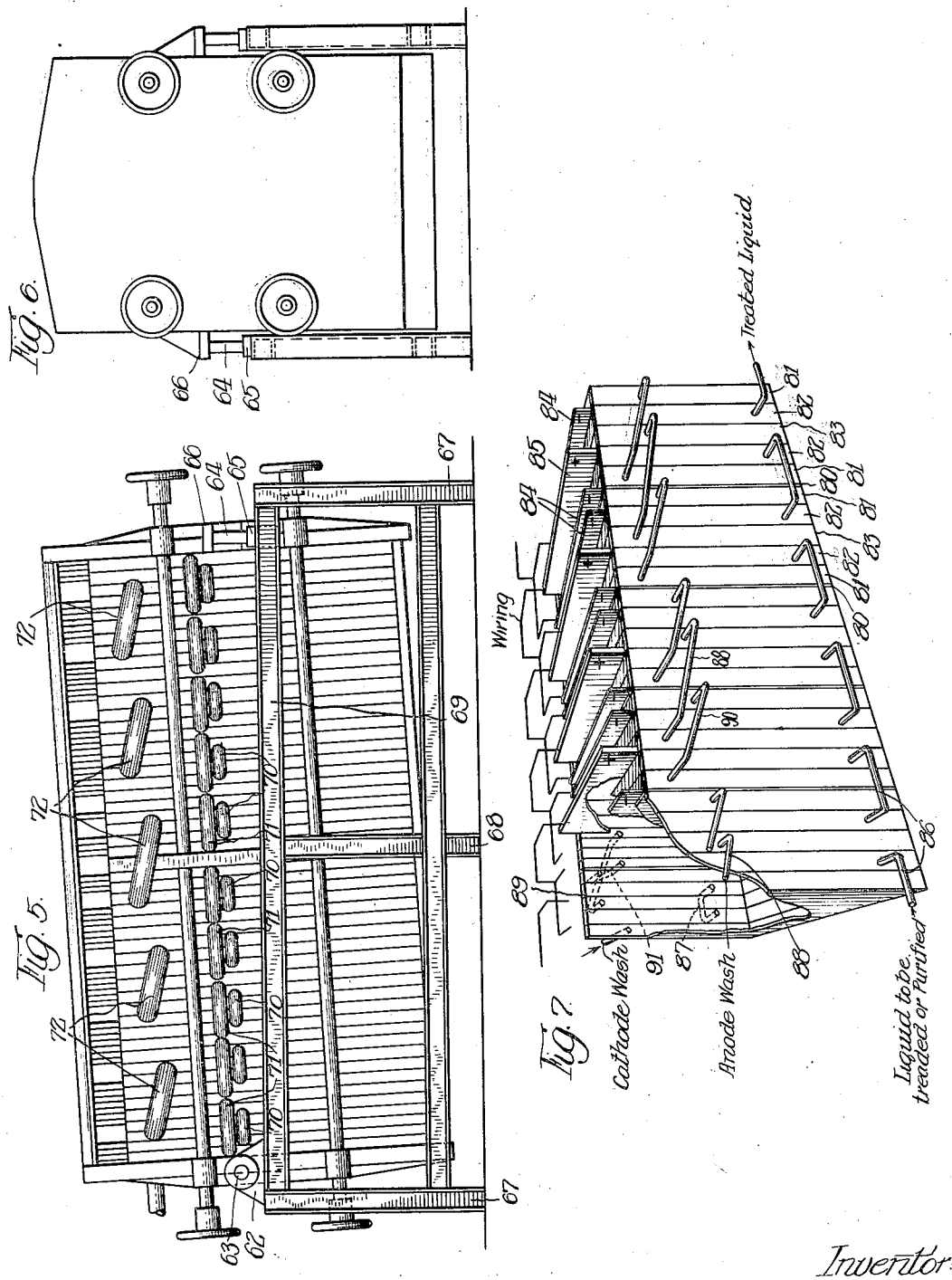

June 7, 1932.  A. B. HODGES  1,861,796
LIQUID TREATMENT
Filed Sept. 6, 1928  3 Sheets-Sheet 3
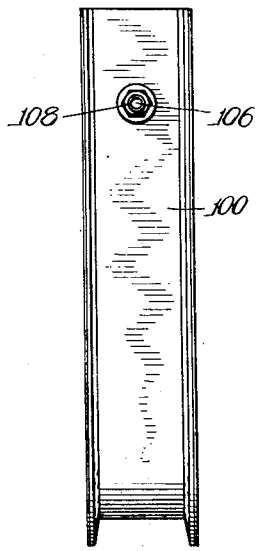
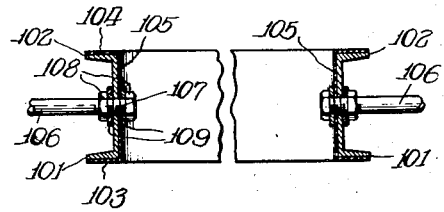
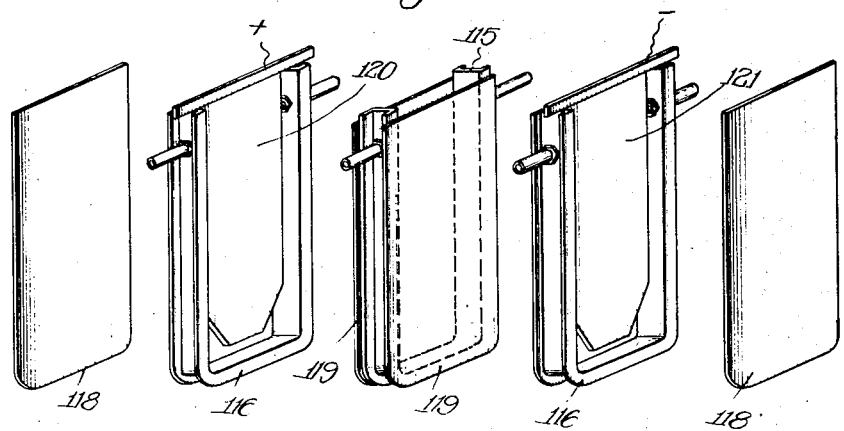
Inventor:
Albert B Hodges,
By Cromwell, Greist & Warden
Attys Patented June 7, 1932

1,861,796

UNITED STATES PATENT OFFICE

ALBERT B. HODGES, OF CHICAGO, ILLINOIS, ASSIGNOR TO GENERAL ZEOLITE COMPANY, OF CHICAGO, ILLINOIS, A CORPORATION OF ILLINOIS

LIQUID TREATMENT

Application filed September 6, 1928. Serial No. 304,217.

This invention relates to a process of liquid treatment, and particularly relates to a process and apparatus for the electro-osmotic purification of water.

In the electro-osmotic treatment or purification of liquids, an electromotive force is impressed on the liquid or an electropotential gradient is maintained within the body of liquid usually by means of placing electrodes in portions of the body of liquid. Customarily the liquid is caused to flow between the electrodes. The electrically charged particles or ions which constitute the principal source of impurity in the liquid are caused to migrate to either the positive or negative electrode, depending upon their charge. These electrically charged particles or ions will be discharged at the electrodes and will tend to accumulate in the liquid surrounding these electrodes. It is necessary to prevent these accumulated materials from diffusing or otherwise going back into the body of liquid being treated or purified, and this is done by washing these impurities away from the electrodes and keeping the electrodes containing these impurities apart from the body of liquid being treated or purified. This separation is usually accomplished by placing permeable diaphragms between the electrode and the body of liquid being treated and placing a body of liquid adapted to wash the electrode, or remove the impurities therefrom, between the diaphragm and the electrode.

In the usual apparatus for the electro-osmotic treatment of liquids, and especially for electro-osmotic purification of water, a series of three or five compartment cells are provided through which liquid being treated or the water being purified is passed. In the three compartment cells, there is a central compartment for the water being purified and there are outside compartments containing an anode and cathode, respectively, and the electrode and the electrode wash liquid. In a five compartment cell, there is a central compartment containing the anode, two intermediate compartments containing the liquid to be purified and two outside compartments containing the cathodes. These compartments both in the three chamber and the five chamber cells, are in ionic communication with each other and are formed or separated from each other by means of permeable diaphragms. In the operation of cells of this character in case of purification of water, raw water or water which has already been partially purified or treated in some other cell, is passed through the compartment adapted to contain the liquid being treated. Raw water is also added to the anode and cathode compartments and is utilized as wash liquor in such compartments. The effluent wash liquor from each electrode compartment is usually run to waste. The water being treated is caused to run from cell to cell by means of a siphon arrangement while the electrode wash liquors are separately added to each electrode compartment by means of separate liquid connections.

An object of this invention is to provide an improved and simplified process and apparatus for the treatment of liquids and especially for the purification of water.

Another object of this invention is to provide an improved electro-osmotic apparatus in which the liquid connections are greatly simplified.

A further object of this invention is to provide an electro-osmotic apparatus in which the flow of electrode wash liquor is continuous through the apparatus and in which the electrode wash liquors are added and removed at only a few places in the apparatus.

A still further object of the invention is to provide an improved apparatus in which both the electrode wash liquor and the liquid being treated are caused to flow through the apparatus by means of gravity.

Other objects will appear during the course of the following description.

In one embodiment of the invention a series of U members with the open part of the U upwardly, are placed side by side and are suitably bolted or otherwise tied together. These U-shaped members are separated by permeable diaphragms when they form part of the same cell or by thin plates of hard rubber or similar insulating and impermeable material when they form parts of different cells. The connections between the sides of the U pieces and the intervening diaphragms or partitions are such that no liquid contained in the open part of the U can leak therethrough. In the three compartment cell there are three U pieces for each cell, while in the five compartment cell there are five U pieces in each cell. The sides of these U pieces are provided with openings at suitable points and liquid connections are made to these openings. The entire set of U pieces is contained in the frame and is adapted to be tilted so that the liquid being treated and the electrode wash liquors will flow through the apparatus in parallel directions and continuously.

Several embodiments of the invention to which the invention is by no means restricted are shown on the accompanying drawings.

Figs. 1, 3 and 5 represent side views while Figs. 2, 4 and 6 represent end views of an electro-osmotic apparatus showing the different means by which it may be supported and tilted;

Fig. 7 diagrammatically represents a modified form of an electro-osmotic apparatus showing the positioning of the anodes, cathodes and the spacing of the different compartments in the cells;

Figs. 8 and 9 represent a detail showing of one of the U members composing the electro-osmotic apparatus shown in Figs. 1 to 6; and Fig. 10 illustrates the manner in which the diaphragms and partitions are assembled with these U members in completing the cells.

In Figs. 1, 3 and 5 the electro-osmotic apparatus is composed of a series of U members 15 which are separated in groups of five by means of the impermeable and insulating partitions 16. Each group of five contains two outer cathode compartments 17, an inner anode compartment 18 and two intermediate compartments 19 for the liquid to be purified or treated. Between the U pieces 15 of any one cell of five compartments are positioned permeable diaphragms which tend to separate the body of liquid around the electrodes from the body of liquid to be treated or purified. All these U pieces are clamped together by means of plates 20 which are provided with projecting ears 25. Through these ears are passed the rods or bolts 26 which also pass through the end members 27 of a frame adapted to hold the electro-osmotic apparatus in any desired position. The ends of the rods 26 are provided with turn wheels 28 which regulate the amount of compression between the end plates 20 and the end members 27 of the frame, or the horizontal beams 29 and the diagonal beams 30, altogether constituting a rigid supporting frame. The electrode hangers are suspended from the beam 29.

One of the end members 27 is adapted to be supported by a base member 40 to which it is connected by the pivotal connection 41. The whole frame may be tilted on this pivotal connection 41 by means of the projection 42 which fits upon the screw-elevating device 43. The screw-elevating device 43 may be turned by means of the polygonal member 44 at the upper end thereof.

In the embodiment of the invention shown in Figures 3 and 4, the lower end of the frame is supported upon the base 50, while the middle portion of the frame is supported by means of the downwardly-projecting portion 51 upon the base 52, to which it is connected by the pivotal connection 53. The frame may be tilted to any desired amount by means of the connection between the projection 54 of the frame and the screw 55. This screw 55 may be turned by means of the squared portion 46 at the top thereof. The frame shown in Figures 3 and 4 differs slightly from the frame shown in Figure 1 in that it contains a slightly different arrangement of structural elements. The portion of the frame between the ends 27 is composed of the horizontal members 56 and 57, the vertical member 58 and the diagonal member 59.

In the embodiment of the invention shown in Figures 5 and 6, the clamping plate 20 of the electro-osmotic apparatus is supported on the standard 62 by means of the pivotal connection 63. The amount of tilt or elevation of the other end of the apparatus is controlled by means of the replaceable spacer 64 which is positioned above the projection 65 upon the frame 66. The frame of the embodiment of the invention shown in Figures 5 and 6 also differs from that shown in Figures 3 and 4. It is composed of two vertical end pieces 67, a middle vertical beam 68 and a horizontal member 69.

By means of the tilting of the electro-osmotic apparatus shown in Figures 1 to 6, it is possible to cause the liquid being treated or purified and the electrode wash liquid to flow through the entire machine in a continuous manner by means of gravity. In the embodiments of the invention shown, the electrode wash liquid is caused to travel in the same direction as the liquid being treated or purified. Upon Figures 1 to 6 the liquid being treated or purified is caused to flow through the cells in series from the highest chamber to the lower chamber by means of the connections or conduits 70 which are shown upon these figures upon one side of the electro-osmotic apparatus. It is obvious, of course, that there is a corresponding set of connections upon the other side of the apparatus. The cathode wash liquid is also caused to flow from cathode compartment to cathode compartment by means of the connections or conduits 71 while the anode wash liquids are caused to flow from anode compartment to anode compartment by means of the connections or conduits 72. When the electrode wash liquids and the liquid being treated or purified are caused to travel in the same direction, the concentration of the liquid in the electrode compartments will increase as the concentration of the liquid in the middle compartment decreases. As a result the fraction of the total voltage drop across the compartment which contains the liquid being treated or purified will become greater in proportion to the fraction of the voltage drop between the diaphragm and the electrode compartments. This is very advantageous inasmuch as it is necessary to employ increasingly higher voltage upon the partially purified water than it is upon the raw water in order to obtain the desired degree of purification or treatment.

In Figure 7 there are shown a series of electro-osmotic cells of five compartments each, which may be clamped together and tilted in the same manner or similar manner as shown upon Figures 1 to 6. In Figure 7 the cells are formed by a series of five U pieces, which are separated from each other by the insulating partitions 80. The cathode compartments are formed by the two U pieces 81, the anode compartment is formed by the U piece 83 and the compartments for the liquide to be treated or purified are formed by the U pieces 82. In the cathode compartments are positioned the cathodes 84 while in the anode compartments are positioned the anodes 85. The liquid being treated or purified is caused to pass through each of the compartments 82 by means of the conduits 86 on the near side of the apparatus and 87 on the far side of the apparatus. The anode wash liquid is also caused to pass through each anode chamber by means of the conduits or connections 88 on the near side of the apparatus and 89 on the far side of the apparatus. The cathode wash liquids are caused to pass through the apparatus by means of the conduits 90 on the near side of the apparatus and 91 on the far side of the apparatus.

In Figures 8 and 9 are shown detailed sectional views of one of the U members of which the apparatus is composed. It will be noted that the U member is formed of a channel beam 100 with the legs 101 and 102 of the channel outwardly. The various U members are adapted to contact with each other along their vertical sides 103 and 104. A piece of rubber or other flexible material is preferably attached to the faces of these vertical sides 103 and 104 and also to the interior face 105 to provide cushioning and insulation. The liquid connections to the compartments formed by these U beams are made by the pipes 106. The pipe 106 is attached by a water tight connection to the vertical sides of the U member. The end of the pipe is threaded as indicated at 107 and is provided with the nuts 108 and the washers 109 which clamp the end of the connection or pipe in position upon the bottom of the channel. The inside nut 108 and washer 109 will bear against the rubber lining and will prevent any leakage. The U members forming the anode compartments are generally thicker than the U members forming the cathode and water compartments due to the fact that the anodes are heavy and have an appreciable thickness. The anode compartment is preferably 1½" to 2" in width, while the other compartments are preferably about 1½" in width or less. The channel beams are advantageous inasmuch as they decrease the weight of the apparatus and at the same time provide an adequate surface along which liquid tight connections may be made. In Figure 10 is shown the manner in which a number of U members together with the partitions and diaphragms and electrodes are assembled into a series of electro-osmotic cells. The cells in this particular instance contain five compartments, but if desired may contain three or some other number. A three compartment electro-osmotic cell may be composed of the central U frame 115 which forms the compartment for the water or liquid to be purified or treated and two end U frames 116 forming the anode and cathode compartments. The electro-osmotic cell is separated from the adjoining electro-osmotic cells by the insulating partitions 118 which cover the open sides of the U frames. The compartments within the cell are separated by the diaphragms 119 which also are adapted to fit between the U frames and over the open portions thereof. The anode 120 and the cathode 121 are suspended within the compartments from the top of the U frames.

It will be noted that in the embodiments of the invention so far shown, the electrode wash liquid and the liquid being treated or purified are passed successively through each electrode compartment of the same sign or through each purifying chamber. If desired, the electrode wash liquid may be caused to pass through every second or every third electrode compartment of the same sign. The electrode wash liquid may also be passed successively through each electrode compartment regardless of the sign, but this is usually not desirable. It will be noted that in this apparatus all the connections are simplified and that the connections to the U members are the same for each cell. The connections are also materially simplified over those on types of apparatus using siphons and a separate flow to each electrode compartment.

What is claimed is:

1. In an electro-osmotic apparatus, a series of U members clamped together, said members being formed of channel beams with their legs directed outwardly and permeable diaphragms and insulating partitions clamped between said U members so as to form a series of electro-osmotic cells.

2. An electro-osmotic apparatus comprising a series of electrodes compartments and compartments for the liquid being treated arranged side by side, the compartments for the electrodes of different signs being separated by the compartments for the liquid being treated and by insulating partitions, and the electrode compartments being separated by permeable diaphragms from the compartments containing the liquid being purified, liquid connections between the compartments containing the liquid being treated, and adjustable means adapted to elevate the successive electrode compartments so that the wash liquid therein shall flow through such compartments by gravity.

3. In an electro-osmotic apparatus, a series of U members clamped together, said members being formed of channel beams, diaphragms and partitions positioned between said U members so as to form electro-osmotic cells, and an insulating covering for the inside portions and sides of said U members.

4. In an electro-osmotic apparatus, a series of U members clamped together, said members being formed of channel beams with their legs directed outwardly, permeable diaphragms, insulating partitions clamped between said U members so as to form a series of electro-osmotic cells, and liquid connections between the cells being made to the sides of the U beams at the bottoms of the channels.

5. In an electro-osmotic apparatus, a series of U-shaped channel members clamped together to form an electro-osmotic unit, permeable diaphragms between channel members and impermeable partitions between groups of channel members so as to form electro-osmotic cells having electrode compartments and compartments for liquid being treated, liquid connections between the compartments, a frame adapted to support the unit, and adjustable means adapted to tilt the frame so as to cause a gravity flow of liquid through the cells of the unit.

6. In an electro-osmotic apparatus, a series of U-shaped channel members clamped together, said channel members having an insulating covering for the inside and abutting faces, and permeable diaphragm clamped between the abutting faces of the channels to provide a plurality of electrode compartments and compartments for liquid to be treated.

In testimony whereof I have hereunto subscribed my name.

ALBERT B. HODGES.